United States Patent [19]

Eitel et al.

[11] Patent Number: 4,492,431

[45] Date of Patent: Jan. 8, 1985

[54] PRESSURE ACTUATED DEFORMABLE MIRROR

[75] Inventors: Frederick G. Eitel, North Palm Beach; Thomas J. Hodges, Palm Beach Gardens, both of Fla.

[73] Assignee: United Technologies Corporation, Hartford, Conn.

[21] Appl. No.: 374,680

[22] Filed: May 4, 1982

[51] Int. Cl.³ .................. G02B 7/18; G02B 5/06
[52] U.S. Cl. .................................................. 350/310
[58] Field of Search .............. 350/310, 295, 487, 360; 250/201 R

[56] References Cited

U.S. PATENT DOCUMENTS

| | | | |
|---|---|---|---|
| 3,967,899 | 7/1976 | O'Meara | 350/295 |
| 4,003,640 | 1/1977 | Hansen | 350/295 |
| 4,091,274 | 5/1978 | Angelbeck et al. | 350/295 |
| 4,344,707 | 8/1982 | Massie | 350/295 |

FOREIGN PATENT DOCUMENTS

| | | | |
|---|---|---|---|
| 1473092 | 3/1967 | France | 350/310 |
| 1475736 | 4/1967 | France | 350/310 |
| 1060662 | 3/1967 | United Kingdom | 350/295 |

OTHER PUBLICATIONS

George R. Wisner et al., SPIE, vol. 179, Adaptive Optics Components II (1979), pp. 41–50.

*Primary Examiner*—Jon W. Henry
*Attorney, Agent, or Firm*—Eric W. Petraske

[57] ABSTRACT

A deformable mirror system employs pressure-operated actuators that vary in extension in response to pressure changes within a cylindrical pressure vessel. Each pressure vessel has its pressure controlled in response to signals generated in a wavefront control system.

4 Claims, 3 Drawing Figures

4,492,431

PRESSURE ACTUATED DEFORMABLE MIRROR

DESCRIPTION

1. Technical Field

The field of the invention is that of deformable mirrors used to adjust laser beams in complex optical systems.

2. Background Art

In the field of high power lasers having large beam diameters, it is common for the quality of the optical beam emerging from the laser gain medium to be inadequate for the purposes at hand. It is known to construct a laser mirror having a thin flexible reflecting surface, the contour of which may be adjusted by means of one or more actuators which extend forward and backward to change the shape and surface contour of the mirror. The prior art has used actuators employing the principle of piezoelectric extension almost exclusively. These actuators have well known defects in that they require voltages on the order of 1,000 volts to produce an adequate extension of the actuator and they suffer from high hysteresis.

DISCLOSURE OF INVENTION

The invention relates to a deformable mirror employed in optical systems in which the mirror contour is controlled by a number of actuators, each of which is a pressure vessel containing a fluid, either gas or liquid, under a controlled pressure. The extension of the actuator is controlled by varying the pressure within the pressure vessel.

BEST MODE FOR CARRYING OUT THE INVENTION

Figure 1:
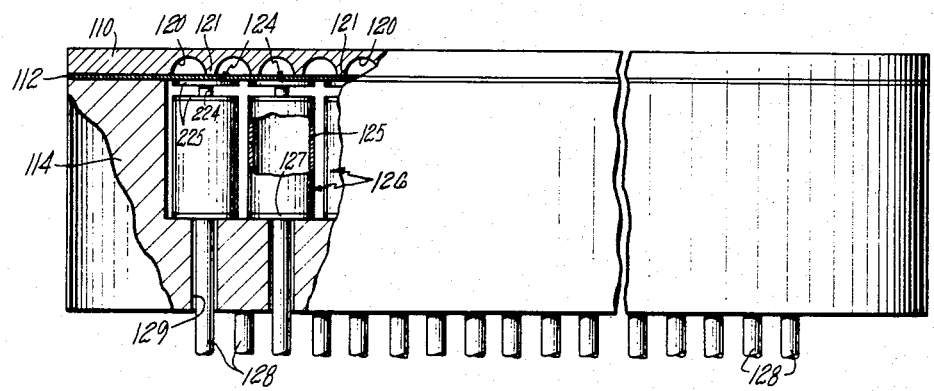
FIG. 1 illustrates a cross section of a deformable mirror constructed according to the invention.

FIG. 1 illustrates in cross section a deformable mirror in which faceplate 110 is a thin flexible membrane polished to an optical finish on the top side and provided with a number of cooling channels 120 separated by lands 121. The cooling channels and lands are spaced and sized as is known in the art to provide sufficient compromise between cooling and flexibility. Cooling channels 120 are enclosed by sheet 112 which is bonded to faceplate 110 by conventional means, such as brazing. The faceplate is supported by substrate 114, a thick, rigid material used to provide support for the actuators of the deformable mirror. Faceplate 110, member 112 and substrate 114 may be formed from molybdenum or any other material known in the laser mirror art. Actual control of the contour of faceplate 110 is provided by a number of actuators 126 each of which is in the form of a small can connected to member 112 by means of flexure 124, a flexible join member known in the art. Flexure 124 may be a thin cylinder 224 between bonding pads 225 or any other coupling mechanism that reduces forces that are at angles other than normal to sheet 112. Actuator 126 comprises a cylindrical pressure vessel formed from seamless tube 125 and cover 127 brazed together to form a gas pressure tight leakproof seal. Actuators 126 are supported by substrate 114 and fed a pressure supply by tubes 128 passing through holes 129 in substrate 114.

In an illustrative embodiment, the distance between actuators 126 is 6 millimeters, the actuator diameter is 0.220 inches having an active length of 2.25 inches, a wall thickness of 0.01 inch and an operating pressure range of 100 to 1100 psig. Actuators 126 are constructed of molybdenum having an elastic modulus value E of $45 \times 10^6$ psi. Using the above parameters together with the known formulas:

$$S = Ee, \quad S = PR/2t \text{ and } e = d/l,$$

where S=stress, E=elastic modulus, e=strain, P=pressure, R=tube radius, t=tube wall thickness, d=axial deflection, l=tube active length, we reach the expression $d = PRl/2tE$ and calculate that the extension d of the actuator is 262 micro inches for a pressure of 1100 psig. Note that the actual displacement of a deformable mirror may be less than this value, depending upon the stiffness of the faceplate. Within this actuator the hoop stress is 11,550 psi, which gives a safety margin of more than a factor of 4 for fully recrystallized molybdenum (0.2% yield limit).

One limiting factor in the frequency response of a deformable mirror constructed according to the invention is the time required for a pressure change to traverse tube 128 between a controlled pressure regulator and an actuator. The pressure change cannot exceed the velocity of sound in the tube which, for helium, is 3,000 feet per second. For a one meter long tube the frequency limit is given by the length divided by the speed of sound and is about 1,000 Hz. This frequency is well above the frequency with which deformable mirrors are conventionally dithered. Another limiting factor is the flow rate, i.e. the rate with which gas can pass through the tube in order to effect a pressure increase or decrease. For the foregoing parameters, including tube internal diameter of one-quarter the actuator diameter, the maximum pressure being the pressure at the maximum velocity location, and the velocity of flow being half the speed of sound in the gas, the limiting frequency at which signals may be transmitted is approximately 300 Hz. This frequency may be increased by employing a combination liquid-gas system in which actuator 126 and tube 128 are filled with a liquid having a considerably greater speed of sound (approximately 40%). A suitable diaphragm or piston is placed near the pressure source to isolate the liquid from the gas in the pressure source. The amount of compressible gas is thus considerably decreased and the time to increase pressure is therefore reduced.

Figure 2:
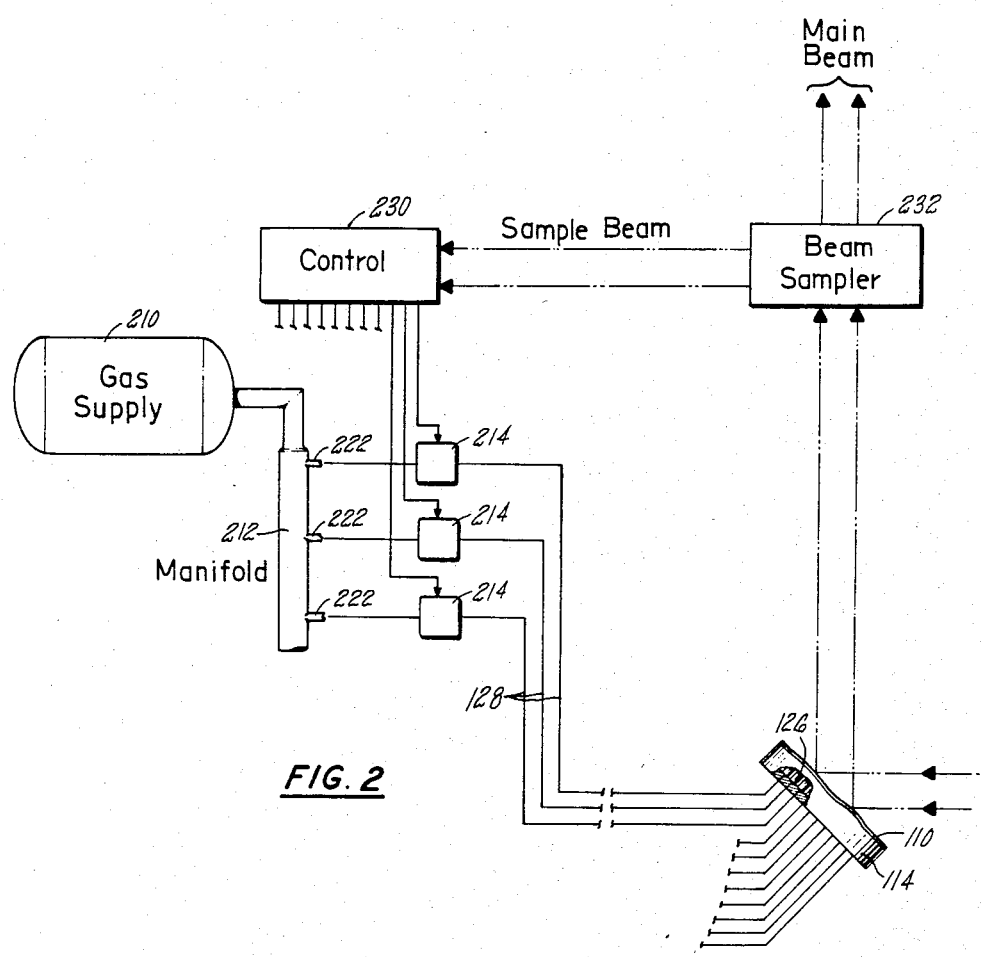
FIG. 2 illustrates a schematic of a gas supply and control system of an embodiment of the invention.

FIG. 2 illustrates schematically a system controlling a deformable mirror. Gas supply 210 contains a reserve volume of gas at high pressure which is fed through manifold 212. Controlled variable pressure regulators 214 receive gas from manifold 212 through tubes 222, and are controlled by control circuits 230 which detect a sample beam tapped off by beam sampler 232 from a main output beam and generate signals to change actuator pressure to adjust the beam quality by changing the surface contour of faceplate 110. Tubes 128 communicate between regulators 214 and actuators 126.

Figure 3:
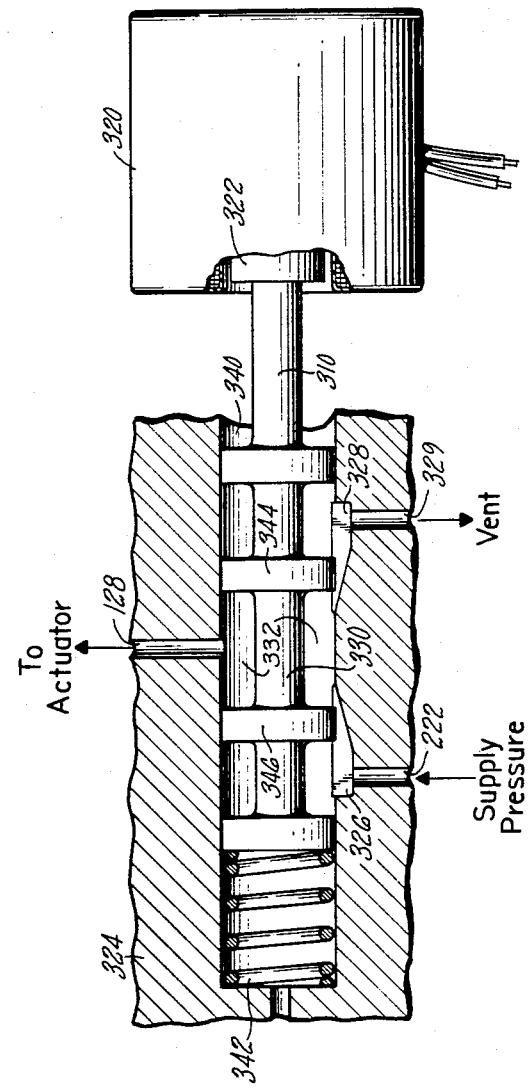
FIG. 3 illustrates details of a pressure control mechanism.

Many forms of variable pressure regulators are known in the art, one suitable form being illustrated in FIG. 3, in which gas at high pressure from manifold 212 enters through tube 222 in block 324, passes through aperture 326, chamber 332 and aperture 328, exiting through tube 329. Tube 128, communicating with actuator 126, also is exposed to the pressure in chamber 332. The pressure in chamber 332 is determined by the action of member 310, which may slide in and out of a cylindrical opening 340, in response to forces exerted by spring 342 and electromagnet 320. When spring 342 is fully compressed, aperture 328 will be closed by lip 344 and the pressure in chamber 332 will rise to the pressure of manifold 212. When spring 342 is fully extended, aperture 326 will be closed by lip 346 and the pressure in chamber 332 will fall to atmospheric pressure, since vent 329 communicates with the atmosphere. Intermediate positions of member 310 will give intermediate values, of course, the dependence of pressure on position being determined by the shape and size of apertures 326 and 328. In operation, control circuits 230 respond to the sample beam to adjust various ones of actuators 126. The particular type of detection device employed is not part of the invention and any of the devices described in a review article by James E. Pearson, presented at the Advisory Group for Aerospace Research and Development Conference: *Special Topics in Optical Propagation* at the Naval Postgraduate School in Monterey, Calif. on Apr. 6–10, 1981, may be used.

The connection between pressure in any particular actuator and its extension will have been determined during system set-up and calibration, so that circuits 230 will adjust the pressure in the several chambers 332 to a value that should approximate the desired extension of actuator 126. The exact extension of any particular actuator for a given pressure will depend on the position of neighboring actuators, of course, and the final actuator position (and pressure) will be reached by successive pressure changes, in accordance with well-known feedback control principles.

We claim:

1. A deformable mirror system comprising:
   a flexible faceplate having a mirror surface with a surface contour;
   a plurality of actuators for determining said surface contour; and
   control means for controlling said plurality of actuators, characterized in that:
   at least one of said actuators is included within a variable pressure control means that comprises a non-piston pressure vessel containing a fluid at a variable pressure and having a variable length dependent on said variable pressure; and
   in which said control means generates a plurality of control signals for controlling said variable pressure in said plurality of actuators by detecting an optical beam having an intensity distribution dependent on said surface contour and generating control signals to said variable pressure control means dependent on said intensity distribution, thereby determining said surface contour.

2. A deformable mirror system according to claim 1, in which said pressure vessel has an elongated cylindrical shape.

3. A deformable mirror system according to claim 2, in which said fluid is a gas.

4. A deformable mirror according to claim 2, in which said fluid within said pressure vessel is a liquid and in which said variable pressure control means apply pressure to a quantity of fluid contained within pressure transfer means connecting said variable pressure control means and said pressure vessel.

* * * * *